(12) United States Patent
Angevin

(10) Patent No.: US 10,890,930 B2
(45) Date of Patent: Jan. 12, 2021

(54) PNEUMATIC CIRCUIT FOR SUPPLYING AIR TO AT LEAST ONE DISCHARGE VALVE AND TO AT LEAST ONE DEVICE FOR DEPRESSURIZING AN OIL ENCLOSURE IN A TURBINE ENGINE

(71) Applicant: SAFRAN AIRCRAFT ENGINES, Paris (FR)

(72) Inventor: Thomas Roger Jacques Angevin, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 231 days.

(21) Appl. No.: 16/217,675

(22) Filed: Dec. 12, 2018

(65) Prior Publication Data

US 2019/0187732 A1 Jun. 20, 2019

(30) Foreign Application Priority Data

Dec. 19, 2017 (FR) ...................................... 17 62462

(51) Int. Cl.
*F02C 9/18* (2006.01)
*F01D 25/18* (2006.01)
(Continued)

(52) U.S. Cl.
CPC ......... *G05D 16/2093* (2013.01); *F01D 25/18* (2013.01); *F01D 25/183* (2013.01);
(Continued)

(58) Field of Classification Search
CPC ...... F02C 9/18; F02C 9/24; F02C 6/08; F02C 7/06; F02C 7/30; F01D 25/18;
(Continued)

(56) References Cited

U.S. PATENT DOCUMENTS 3,137,999 A * 6/1964 Bruno ..................... F16K 11/00
60/786
9,207,688 B2 * 12/2015 Simpson ................ B64D 13/00
(Continued)

FOREIGN PATENT DOCUMENTS

EP   1 923 553 A2   5/2008
FR   2 982 319 A1   5/2013
(Continued)

OTHER PUBLICATIONS

French Preliminary Search Report dated Aug. 13, 2018 in French Application 17 62462, filed on Dec. 19, 2017 (with English Translation of Categories of Cited Documents).

*Primary Examiner* — Steven M Sutherland
*Assistant Examiner* — Rodolphe Andre Chabreyrie
(74) *Attorney, Agent, or Firm* — Oblon, McClelland, Maier & Neustadt, L.L.P.

(57) ABSTRACT

The invention provides a pneumatic circuit for supplying air to at least one discharge valve that is pneumatically actuated and to at least one depressurizing device for depressurizing an oil enclosure in a turbine engine, the pneumatic circuit comprising: a pneumatic control unit having at least one solenoid valve supplying compressed air to a discharge valve of a compressor of the turbine engine; at least one depressurizing device for depressurizing an oil enclosure of the turbine engine, the device including a compressed air ejector for depressurizing the oil enclosure; and a pneumatic bistable member that is supplied with air by different first and second compressed air sources and that is suitable for supplying the pneumatic control unit and the depressurizing device with air coming from the first or the second compressed air source as a function of the operating speed of the turbine engine.

9 Claims, 2 Drawing Sheets

(51) Int. Cl.
*F02C 7/06* (2006.01)
*F02C 6/08* (2006.01)
*G05D 16/20* (2006.01)
*F16N 7/30* (2006.01)

(52) U.S. Cl.
CPC .................. *F02C 6/08* (2013.01); *F02C 7/06* (2013.01); *F02C 9/18* (2013.01); *F16N 7/30* (2013.01); *F05D 2260/601* (2013.01); *F05D 2270/62* (2013.01); *F05D 2270/65* (2013.01)

(58) Field of Classification Search
CPC ............. F01D 25/183; F05D 2260/601; F05D 2270/65; F05D 2270/301; F05D 2270/3011; F05D 2270/3013; F05D 2270/3015; G05D 16/2093
See application file for complete search history.

(56) References Cited

U.S. PATENT DOCUMENTS

| | | | |
|---|---|---|---|
| 9,822,900 B2 * | 11/2017 | Franconi | F16K 11/048 |
| 2008/0115503 A1 | 5/2008 | Vasquez et al. | |
| 2010/0092116 A1 * | 4/2010 | Franconi | F01D 25/183 |
| | | | 384/317 |
| 2013/0115055 A1 | 5/2013 | Mottet et al. | |
| 2015/0260100 A1 * | 9/2015 | Trohel | F01D 25/20 |
| | | | 60/39.08 |

FOREIGN PATENT DOCUMENTS

| | | | |
|---|---|---|---|
| FR | 3 034 752 A1 | 10/2016 | |
| WO | WO 2014/060656 A1 | 4/2014 | |

\* cited by examiner

PNEUMATIC CIRCUIT FOR SUPPLYING AIR TO AT LEAST ONE DISCHARGE VALVE AND TO AT LEAST ONE DEVICE FOR DEPRESSURIZING AN OIL ENCLOSURE IN A TURBINE ENGINE

BACKGROUND OF THE INVENTION

The present invention relates to the general field of air supply circuits in a turbine engine. It relates more particularly to a pneumatic circuit for supplying air, firstly to an actuator device for compressed air discharge valves in a high-pressure compressor of the turbine engine, and secondly to devices for depressurizing oil enclosures in the turbine engine.

A turbine engine has several air discharge valves, including some referred to as handling bleed valves (HBVs) that are dedicated to discharging air from the high-pressure compressor of the turbine engine.

Each discharge valve has a movable shutter member that is movable relative to a casing of the turbine engine between a position in which it shuts an air-passing orifice formed through the casing, and a position in which it opens that orifice. Opening such orifices serves to discharge a fraction of the air from the primary stream under certain conditions of operation of the turbine engine, e.g. in order to reinject that air into the secondary stream.

Discharge valves present on/off operation and they can be controlled independently of one another. The present invention lies in a context where HBV-type discharge valves are actuated pneumatically. These valves may be of the poppet type, i.e. each of them may operate as a valve having a movable shutter member that is subjected to a pressure difference between two control chambers, and that moves against the action of the spring. The pneumatic muscle that serves to actuate each valve by acting on the pressure difference in the valve is typically controlled by a solenoid valve installed in a pneumatic control unit (PCU) of the turbine engine that is itself supplied with air by bleeding compressed air from the turbine engine. In the PCU, there is generally a solenoid valve that is dedicated to each HBV-type discharge valve that is to be actuated. The pneumatic control member is itself electrically controlled by the engine computer via harnesses.

The PCU is supplied with air by a pneumatic circuit of the turbine engine supplying air bled from the outlet of the high-pressure compressor of the turbine engine. Given the high temperatures of air at this location of the high-pressure compressor, potentially exceeding 600° C. for example, it is necessary to cool the air before it enters into the PCU. Specifically the technology and the materials of the PCU (and in particular its electrical components) make it incompatible with high temperatures, typically temperatures greater than 200° C. For this purpose, the pneumatic circuit of the turbine engine generally includes an air/air heat exchanger (referred to as a "surface air cooled air cooler" (SACAC)) upstream from the PCU, and the air bled from the outlet of the high-pressure compressor is cooled therein before penetrating into the PCU. Unfortunately, the SACAC air/air heat exchanger uses as its cold source air that is bled from the secondary stream through the turbine engine, and that can give rise to head losses and degrade the performance of the engine.

Furthermore, a turbine engine is also provided with devices for depressurizing oil enclosures (also known as "oil sump depressurization systems" (OSDS)) that contain the bearings and various gears of the engine. Such devices serve to avoid oil leaking through sealing gaskets at the boundaries of such enclosures by maintaining a pressure difference relative to surrounding cavities. In particular, a minimum pressure difference value needs to be maintained during all operating speeds of the turbine engine.

Thus, publication FR 3 034 752 discloses an oil enclosure depressurization device that includes a jet pump type ejector that is supplied with air under pressure. In order to operate, that depressurization device requires the ejector to be supplied with air under high pressure. Specifically, the higher the pressure supplied to the ejector, the greater the depressurization effect. Unfortunately, depressurization requirements are not always the same under all operating speeds of the turbine engine.

In order to optimize the specific fuel consumption (SFC) of the engine, it is possible to reduce the performance of depressurization devices at certain points in the flight envelope (e.g. by reducing the high pressure air flow rate). For this purpose, it is possible to fit the depressurization devices with a valve that is controlled by the computer and that serves to select two flow rate positions: a fully open position when the need for depressurization is great, and an intermediate position for other situations. Nevertheless, having recourse to such an internal valve makes depressurizing devices more complex to operate.

The pneumatic control and depressurization functions of oil enclosures make use of the same pneumatic muscle as the last stages of the high-pressure compressor of the turbine engine. Unfortunately, as mentioned above, the high temperatures associated with those last compression stages make it necessary to implement and air/air heat exchanger to cool the control air supplied to the PCU.

OBJECT AND SUMMARY OF THE INVENTION

A main object of the present invention is to mitigate such drawbacks by proposing a pneumatic circuit that optimizes the management of pneumatic muscles so as to reduce the number of pneumatic members and limit their impacts on the fuel consumption of the engine.

This object is achieved by a pneumatic circuit for supplying air to at least one discharge valve that is pneumatically actuated and to at least one depressurizing device for depressurizing an oil enclosure in a turbine engine, the pneumatic circuit comprising: a pneumatic control unit having at least one solenoid valve supplying compressed air to a discharge valve of a compressor of the turbine engine; and at least one depressurizing device for depressurizing an oil enclosure of the turbine engine, the device including a compressed air ejector for depressurizing the oil enclosure; the pneumatic circuit further comprising, in accordance with the invention, a pneumatic bistable member that is supplied with air by different first and second compressed air sources and that is suitable for supplying the pneumatic control unit and the depressurizing device with air coming from the first or the second compressed air source as a function of the operating speed of the turbine engine.

The pneumatic circuit of the invention is thus remarkable in that provision is made to group together the functions of depressurizing and of the pneumatic control unit by using a single pneumatic muscle, thus making it possible to optimize the bleeding of air via a pneumatic bistable member that serves to adjust the bleed port as well as possible. More precisely, the bistable member of the circuit of the invention serves to switch between two compressed air sources: one source corresponding to the need for a strong pneumatic muscle but also leading to high temperatures, and another source corresponding to a need for a pneumatic muscle that is less strong, but benefiting from lower temperatures.

The switching between the two compressed air sources takes place as a function of the operating speed of the turbine engine. More particularly, at a low speed of operation (starting the engine and idling) the pressure of the air in the turbine engine is relatively low because the engine is rotating slowly. In order to enable the pneumatic control unit and the depressurizing device to operate properly, the bistable member supplies compressed air from as far as possible downstream in the compressor of the turbine engine, since this air is not yet so hot as to run the risk of damaging the control unit (PCU). At high speeds of operation (takeoff, cruising, and climbing) the engine is hotter and so is the air bled from it. In order to enable electrical components (including the PCU) to operate properly, the bistable member supplies compressed air a relatively low temperature, this air nevertheless being compressed sufficiently to ensure proper operation of the pneumatic muscle.

According to an advantageous provision, the pneumatic bistable member comprises an actuator for supplying the pneumatic control unit and the depressurizing device with compressed air coming from the first or the second compressed air source depending on an operating speed of the turbine engine, and a selector for selecting the source of the compressed air supplied by the actuator as a function of the pressure level of the first compressed air source.

Under such circumstances, the selector of the pneumatic bistable member may comprise a piston separating two chambers in leaktight manner, one of the chambers being supplied with air at ambient pressure, and the other chamber being supplied with air coming from the first compressed air source, which air is at a pressure higher than ambient pressure at all operating speeds of the turbine engine; and the actuator of the pneumatic bistable member may comprise: a piston that separates two chambers in leaktight manner, one of the chambers being supplied with air at ambient pressure coming from the selector, and the other chamber being supplied with air coming from the second compressed air source; and a valve member having two seats and secured to the piston, thereby forming a two-way selector valve for causing an outlet of the actuator to communicate selectively either with the chamber supplied with air coming from the second compressed air source, or else with an inlet connected to the first compressed air source.

Preferably, the piston of the selector of the pneumatic bistable member includes a return spring that is rated to a predetermined pressure defining a changeover threshold for the pneumatic bistable member. Under such circumstances, the pressure defining the changeover threshold of the pneumatic bistable member is advantageously predetermined to enable the pneumatic bistable member to supply to the pneumatic control unit and the depressurizing device with compressed air coming from the first compressed air source at low speeds of operation of the turbine engine and coming from the second compressed air source at high speeds of operation of the turbine engine.

Also preferably, the first compressed air source is a high-pressure stage of a high-pressure compressor of the turbine engine and the second compressed air source is an intermediate stage of the high-pressure compressor.

In another advantageous provision, the circuit does not include an air/air heat exchanger upstream from the pneumatic control unit and the depressurizing device does not include an internal flow rate selection valve upstream from the ejector.

The invention also provides a turbine engine including a pneumatic circuit as defined above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
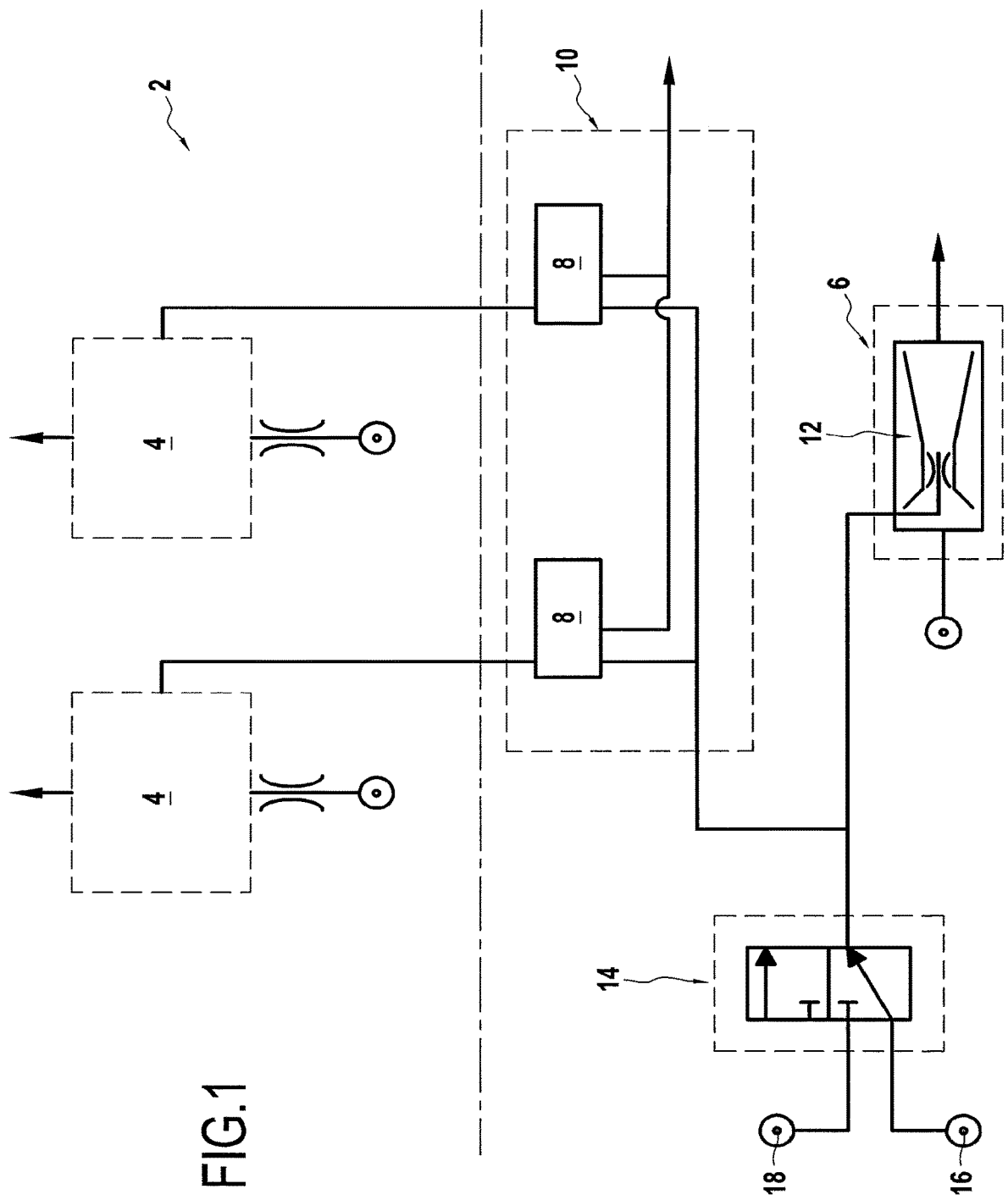
FIG. 1 is a diagrammatic view of a pneumatic circuit in accordance with the invention.

FIG. 1 is a highly diagrammatic view of a pneumatic circuit 2 of the invention for a turbine engine, which circuit is for supplying compressed air firstly to two discharge valves 4 and also to a depressurizing device 6.

The discharge valves 4 (specifically handling bleed valves (HBVs)) are commonly used for discharging some of the air from the primary stream through the turbine engine under certain operating conditions of the engine, e.g. in order to reinject it into the secondary stream.

The discharge valves 4 present on/off operation and they can be controlled independently of one another. These valves are actuated by a pneumatic muscle controlled by two solenoid valves 8 that are installed in the pneumatic control unit (PCU) 10 of the turbine engine. The PCU is itself electrically controlled by the engine computer via harnesses (not shown).

The depressurizing device 6 (also known as an "oil sump depressurization system" (OSDS)) serves to avoid oil leaking through the sealing gaskets at the boundaries of oil enclosures of the turbine engine that contain bearings and various gears of the engine, by maintaining some minimum pressure difference value relative to surrounding cavities at all operating speeds of the turbine engine. For this purpose, and as described in particular in publication FR 3 034 752, the depressurizing device has a jet pump type ejector 12 that is supplied with pressurized air.

The pneumatic circuit 2 of the invention further comprises a pneumatic bistable member 14 that is supplied with air by a first compressed air source 16 and by a second compressed air source 18 that is different from the first source. The function of the bistable member 14 is to supply both the pneumatic control unit 10 and the depressurizing device 6 with compressed air coming from the first or from the second source of compressed air, as a function of the operating speed of the turbine engine.

By way of example, it is assumed that the first compressed air source 16 is a high-pressure stage of the high-pressure compressor of the turbine engine, while the second compressed air source 18 is an intermediate stage of the high-pressure compressor.

Switching between the two compressed air sources 16 and 18 is performed as a function of the operating speed of the turbine engine. More precisely, when operating at a low speed (starting the engine and idling), the pneumatic bistable member 14 supplies the pneumatic control unit 10 and the depressurizing device 6 with air coming from the first compressed air source 16. Specifically, this air is sufficiently compressed to operate the pneumatic muscle, but it is not yet so hot as to risk damaging the control unit. At high operating speeds (takeoff, cruising, and climbing), the bistable member 14 supplies the control unit 10 and the depressurizing device 6 with air coming from the second compressed air source 18. This air is not too hot, and therefore does not risk damaging the control unit, however it is still sufficiently compressed to enable the pneumatic muscle to operate.

Figure 2:
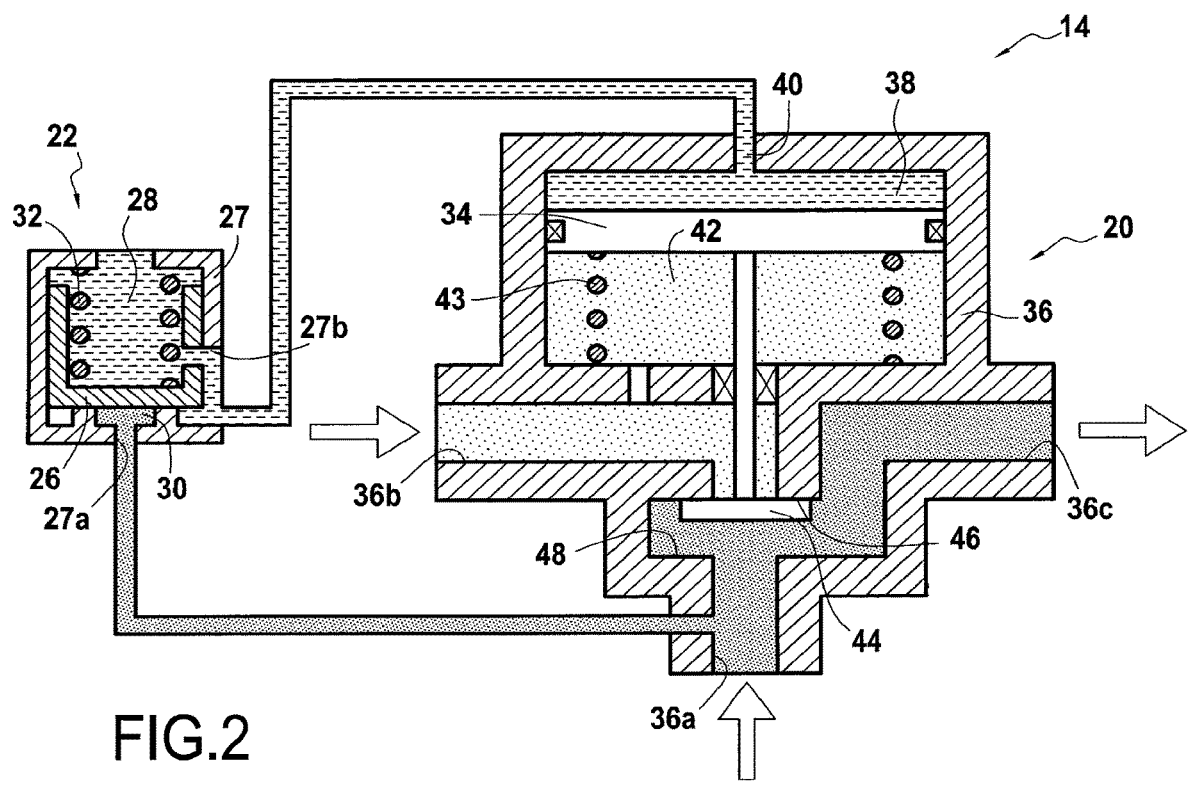
FIGS. 2 and 3 are views of the pneumatic bistable member of the FIG. 1 circuit in its two modes of operation.
Figure 3:
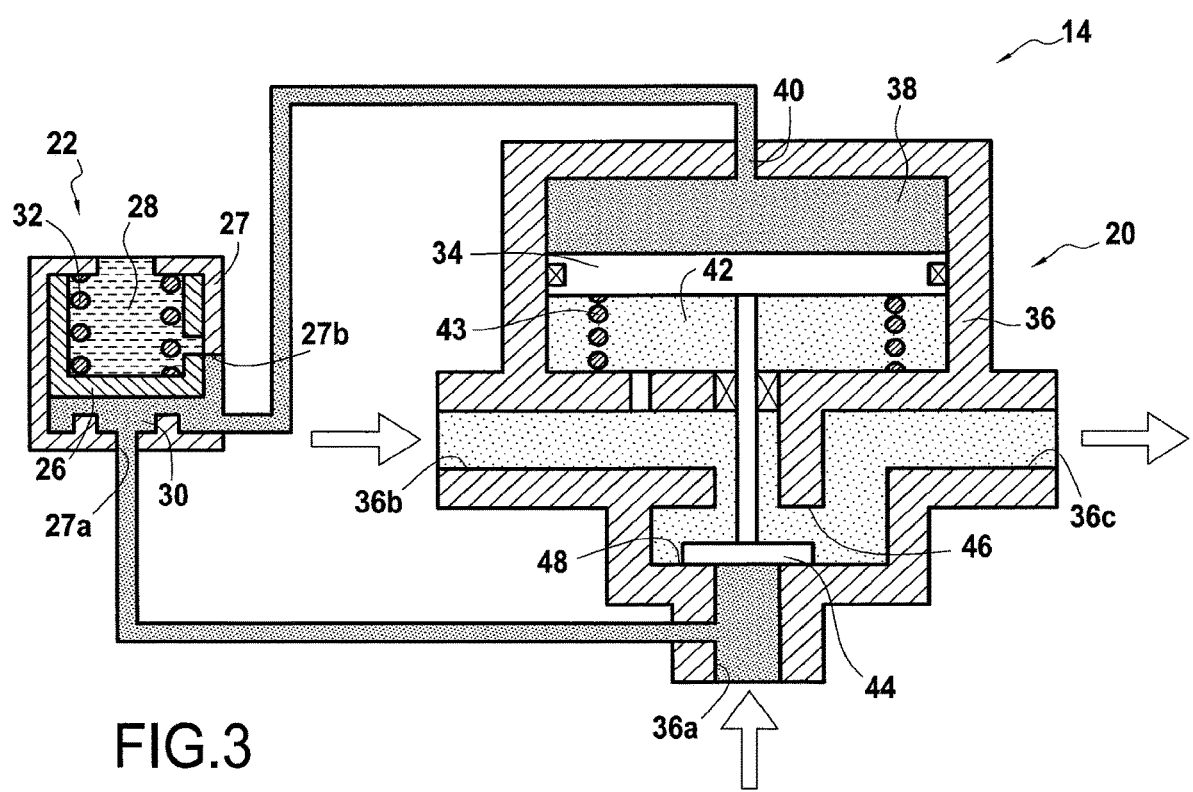

With reference to FIGS. 2 and 3, there follows a description of an embodiment of the pneumatic bistable member 14.

The bistable member 14 comprises an actuator 20 having the function of supplying compressed air to the control unit 10 and to the depressurizing device 6, and a selector 22 having the function of selecting the source of the compressed air that is supplied by the actuator as a function of the pressure level of the first compressed air source 16.

The selector 22 of the bistable member comprises a piston 26 that is housed in a cylinder 27 having a compressed air inlet 27a and a compressed air outlet 27b. The piston 26 subdivides two chambers in leaktight manner: a first chamber 28, which is subjected to ambient pressure Pa (close to atmospheric pressure); and a second chamber 30 that is supplied with air coming from the first compressed air source 16, this air having a pressure P1 that is higher than the pressure P2 of the air coming from the second compressed air source 18.

The piston 26 of the selector 22 of the bistable member includes a return spring 32 that is rated by a predetermined pressure defining a changeover threshold S for the bistable member, this changeover threshold S corresponding to the pressure for switching between air coming from the first compressed air source 16 at low operating speeds of the turbine engine and air coming from the second compressed air source 18 at high operating speeds of the turbine engine for supplying to the control unit and to the depressurizing device.

The actuator 20 of the bistable member also comprises a piston 34 that is housed in a cylinder 36 having a first inlet 36a in communication with the first compressed air source, a second inlet 36b in communication with the second compressed air source, and an outlet 36c in communication with the control unit and with the depressurizing device.

The piston 34 separates two chambers in leaktight manner, namely: a first chamber 38 communicating with the outlet 27b of the selector 22 via an inlet port 40; and a second chamber 42 that is supplied with air coming from the second compressed air source via the second inlet 36b and that houses a return spring 43. It should be observed that the pressure P2 of the air coming from the second compressed source is higher than ambient pressure Pa at all operating speeds of the turbine engine.

The actuator 20 also includes a valve member 44 that is secured to the piston 34 and that co-operates with two seats (a high seat 46 and a low seat 48) so as to form a two-way selector valve for making the outlet 36c of the actuator communicate selectively either with the first inlet 36a of the actuator, which is in communication with the first compressed air source (as shown in FIG. 2), or else with the second chamber 42 that is supplied with air coming from the second compressed air source via the first inlet 36a.

The operation of the pneumatic bistable member 14 stems clearly from the above.

In the configuration shown in FIG. 2 (corresponding to a "high-pressure" mode of operation), the pressure P1 of the first compressed air source is lower than the changeover threshold pressure S.

In this configuration, the piston 26 of the selector 22 remains in its low position such that the outlet 27b of the selector supplies air at ambient pressure Pa. The first chamber 38 of the actuator 20 is thus subjected to ambient pressure Pa. Since the pressure P2 of the air coming from the second compressed air source is higher than ambient pressure Pa, the piston 34 of the actuator is in its high position.

In this high position of the piston, the valve member 44 is pressed against its high seat 46 so that the first inlet 36a of the actuator is in communication with the outlet 36c. The air supplied to the control unit and to the depressurizing device is thus air coming from the first compressed air source (i.e. air coming from a high-pressure stage of the high-pressure compressor of the turbine engine).

In the configuration shown in FIG. 3 (corresponding to an "intermediate-pressure" mode of operation), the pressure P1 of the first compressed air source becomes greater than the changeover threshold pressure S.

The piston 26 of the selector 22 is thus pushed into its high position such that the outlet 27b of the selector communicates with the inlet 27a and supplies air at the pressure P1 (first compressed air source). The first chamber 38 of the actuator 20 is thus likewise subjected to the pressure P1. Since the pressure P1 of the air coming from the first compressed air source is higher than the pressure P2 of the air coming from the second compressed air source and occupying the second chamber 42 of the actuator, the piston 34 therein is put into its low position.

In this low position of the piston, the valve member 44 comes to bear against its low seat 48 such that the outlet 36c of the actuator is in communication with the second inlet 36b. The air supplied to the control unit and to the depressurizing device is thus air coming from the second compressed air source (i.e. air coming from an intermediate stage of the high-pressure compressor of the turbine engine).

The actuator 20 of the bistable member 14 thus supplies compressed air to its outlet 36c either from the first compressed air source 16 or from the second compressed air source 18, depending on the position of the selector 22.

As a result, the pneumatic circuit of the invention uses air coming from the first compressed air source 16 (air at high pressure) at low operating speeds of the turbine engine, and then when the temperature of this air becomes too high and air at an intermediate pressure becomes sufficiently compressed to actuate the control unit and the depressurizing device, it uses air coming from the second compressed air source 18 (air at intermediate pressure).

In comparison with the prior art, with such a bistable member, it thus becomes possible to omit the air/air heat exchanger (also referred to as the "surface air cooled air cooler" (SACAC)) upstream from the pneumatic control unit 10.

Furthermore, including a bistable member in the pneumatic circuit serves to simplify the operation of the primary portion of the depressurizing device 6. Specifically, the pressure modulation that arises as a result of introducing the bistable between the two sources of compressed air serves to modulate the rate at which air is supplied to the ejector 12 of the depressurizing device, such that the device need no longer have an internal valve for selecting flow rate upstream from the ejector, as is provided in the prior art.

The invention claimed is:

1. A pneumatic circuit for supplying air to at least one discharge valve that is pneumatically actuated and to at least one depressurizing device for depressurizing an oil enclosure in a turbine engine, the pneumatic circuit comprising:
    a pneumatic control unit having at least one solenoid valve supplying compressed air to a discharge valve of a compressor of the turbine engine; and
    at least one depressurizing device for depressurizing an oil enclosure of the turbine engine, the device including a compressed air ejector for depressurizing the oil enclosure; wherein the pneumatic circuit further comprises a pneumatic bistable member that is supplied with compressed air by different first and second compressed air sources and that is suitable for supplying the pneumatic control unit and the depressurizing device with the compressed air coming from the first or the second compressed air source as a function of an operating speed of the turbine engine.

2. The circuit according to claim 1, wherein the pneumatic bistable member comprises an actuator for supplying the pneumatic control unit and the depressurizing device with the compressed air coming from the first or the second compressed air source depending on the operating speed of the turbine engine, and a selector for selecting the source of the compressed air supplied by the actuator as a function of a pressure level of the first compressed air source.

3. The circuit according to claim 2, wherein:

the selector of the pneumatic bistable member comprises:

a selector piston separating two selector chambers in leaktight manner, one of the selector chambers being supplied with ambient air at ambient pressure and the other selector chamber being supplied with the compressed air coming from the first compressed air source, which air is at a pressure higher than the ambient pressure at all operating speeds of the turbine engine; and the actuator of the pneumatic bistable member comprises:

an actuator piston that separates two actuator chambers in leaktight manner, one of the actuator chambers being supplied with the ambient air at ambient pressure coming from the selector, and the other actuator chamber being supplied with the compressed air coming from the second compressed air source; and a valve member having two seats and secured to the actuator piston, thereby forming a two-way selector valve for causing an outlet of the actuator to communicate selectively either with the actuator chamber supplied with the compressed air coming from the second compressed air source, or else with an inlet connected to the first compressed air source.

4. The circuit according to claim 3, wherein the selector piston of the selector of the pneumatic bistable member includes a return spring that is rated by a predetermined pressure defining a changeover threshold for the pneumatic bistable member.

5. The circuit according to claim 4, wherein the pressure defining the changeover threshold of the pneumatic bistable member is predetermined to enable the pneumatic bistable member to supply the pneumatic control unit and the depressurizing device with compressed air coming from the first compressed air source at low speeds of operation of the turbine engine and coming from the second compressed air source at high speeds of operation of the turbine engine.

6. The circuit according to claim 5, wherein the first compressed air source is a high-pressure stage of a high-pressure compressor of the turbine engine and the second compressed air source is an intermediate stage of the high-pressure compressor.

7. The circuit according to claim 1, wherein the pneumatic circuit does not include an air/air heat exchanger upstream from the pneumatic control unit.

8. The circuit according to claim 1, wherein the depressurizing device does not include an internal flow rate selection valve for upstream from the ejector.

9. A turbine engine including a pneumatic circuit according to claim 1.

* * * * *